United States Patent

Merten et al.

[11] Patent Number: 5,927,476
[45] Date of Patent: Jul. 27, 1999

[54] CONVEYOR PAN CONNECTION FOR SCRAPER CHAIN CONVEYORS IN PARTICULAR FOR USE IN MINING

[75] Inventors: Gerhard Merten, Lünen; Siegfried Schmidt, Bottrop, both of Germany

[73] Assignee: DBT Deutsche Bergbau-Technik GmbH, Germany

[21] Appl. No.: 08/838,000

[22] Filed: Apr. 16, 1997

[30] Foreign Application Priority Data

Apr. 30, 1996 [DE] Germany ............... 296 07 857 U

[51] Int. Cl.⁶ .................... B65G 19/28; B65G 21/00
[52] U.S. Cl. .................... 198/735.6; 198/861.2
[58] Field of Search .................. 198/861.1, 861.2, 198/860.2, 735.6, 735.2

[56] References Cited

U.S. PATENT DOCUMENTS 5,224,582  7/1993  Hahn et al. .
5,287,955  2/1994  Steinkuhl et al. .................. 198/861.2

FOREIGN PATENT DOCUMENTS 23 35 250    1/1975   Germany ............... 198/735.2
2153181     12/1977   Germany .
2904525     11/1981   Germany .
4006183      9/1991   Germany .
4128512      3/1993   Germany .
295 02 953 U 5/1995   Germany .

Primary Examiner—Joseph E. Valenza
Assistant Examiner—Mark Deuble
Attorney, Agent, or Firm—Vickers, Daniels & Young

[57] ABSTRACT

A conveyor pan connection of a scraper chain conveyor which conveyor pans having side profiles having profiled strips which form guide channels for scrapers and having outwardly directed flange strips. The conveyor pan connection includes coupling plates which are welded in between the outwardly directed flange strips at the ends of the side profiles of the conveyor pans, a first coupling plate projecting from an end of a first conveyor pan over a joint between conveyor pans and a second coupling plate at the opposing end of a second conveyor pan is set back with respect to the joint. Each coupling plate is comprised of a plate portion, an outwardly projecting coupling pin with a convexly rounded rear face, an outwardly projecting retaining lug on the same face and toward the end of the coupling plate distal to the joint, and one or more integral ribs on the rear side of the plate, such that when the coupling plate is in position on the side profile, the plate portion is concealed between the outwardly directed flange strips.

17 Claims, 3 Drawing Sheets

CONVEYOR PAN CONNECTION FOR SCRAPER CHAIN CONVEYORS IN PARTICULAR FOR USE IN MINING

The invention relates to a conveyor pan connection for scraper chain conveyors, which are intended in particular for use in mining, of the type specified in the precharacterizing clause in claim 1.

INCORPORATION BY REFERENCE

As background information so that the specification need not specify in detail what is known in the art, German Patent Application No. DE 4,006,138 A1 (U.S. Pat. No. 5,224,582) and DE 4,128 512 A1 (U.S. Pat. No. 5,287,955) are incorporated herein by reference to illustrate conveyor pans for scraper chain conveyors which correspond to the conveyor pans disclosed in the specification and the drawings.

BACKGROUND OF THE INVENTION

The scraper chain conveyors used with preference is underground mining operations as face or gate conveyors have, as known, a conveying trough which is made up of individual conveyor pans which are interconnected by means of conveyor pan connections in a tensionally resistant manner while allowing limited vertical and horizontal movement. Numerous difference designs of the conveyor pans and their side profiles and also numerous designs of the conveyor pan connections are known.

In the case of the scraper chain conveyor which is known and has proven successful in practical mining operations, use is made of conveyor pans whose side profiles, serving for guiding the scrapers, respectively comprise two profiled strips which are welded to the conveying base lying in between (DE 40 06 183 A1, DE 41 28 512 A1, DE-U 295 02 953.6). In the case of these scraper chain conveyors, for the conveyor pan connections use is always make of toggle connections, the toggle pins of which are inserted in toggle pockets of the coupling plates which are welded in between the outwardly directed flange strips of the side profiles.

Among the numerous known conveyor pan connections, the prior art also includes those in which there are used as coupling elements chain link-like double shackles, which are fitted by their inner openings, divided by a cross-piece, onto coupling pins and are secured in the coupling position by means of releasable securing elements, which comprise, for example, two-pronged forks which can be inserted into bores of retaining lugs. In the case of these long-known conveyor pan connections, the coupling parts are arranged on the outside, either directly on the side profiles of the conveyor pans or else on attachments, for example guide bars, which are screwed on the side profiles of the conveyor pans (DE 21 53 181 C2, DE 29 04 525 C2).

SUMMARY OF THE INVENTION

According to the invention, the conveyor pan connection known per se for other types of conveyor and having the double shackle forming the coupling element is now also used in the case of a known scraper chain conveyor, the conveyor pans of which are provided on the profiled strips forming the side profiles with outwardly directed flange strips. In this case, the coupling plates, designed as one-piece forged parts, are welded in as profile-reinforcing web parts between the flange projections of the side profiles in such a way that, as known per se in the case of the toggle connections, one coupling plate projects over the joint in the conveying trough and the other coupling plate is set back correspondingly with respect to the joint in the trough, so that on the one hand a certain side centring of the two conveyor pans is achieved and on the other hand a lateral covering of the joint in the trough by the projecting coupling plate is achieved. The two coupling plates are of the same design as each other and are welded in, such that they are concealed, in the profiled space between the flange strips, arranged one above the other, of the side profiles. In this case, the coupling plates have on their rear side, facing the side profile, integrally formed-on ribs, which engage in the profiled recesses of the conveyor pan side profiles in line with the conveying base and are adapted in shape to this profiled recess, thereby achieving at the same time a reinforcement of the coupling plates. The rib on each coupling plate preferably extends essentially only over the end region of the latter on the joint side, where the coupling pin is located on the outer side of the coupling plate. The coupling pins have, moreover, convexly bent rear faces, adapted to the adjacent inner contour of the inner openings of the double shackle, and are secured, as known, by means of simple U-shaped tow-pronged forks, which are inserted into bores of the retaining lugs. The various design features taken together therefore produce for the special profile shaping of the conveyor pans a conveyor pan connection which, if need be, can replace the toggle connections previously used exclusively here.

In a further advantageous refinement of the invention, the coupling plates respectively have a plate recess on their upper and lower longitudinal edge, at a distance from their free end face, this distance corresponding approximately to the amount by which one of the two coupling plates projects over the joint in the trough. With coupling plates welded onto the flange strips of the side profiles, these recessed permit the vertical angular movements of the conveyor pans in relation to one another.

Furthermore, it is recommendable to provide the coupling pins at their lower limitation with a peripheral bead reaching over the fitted-on double shackle at the inner contour of the inner opening, whereby a better seating of the double shackle fitted onto the coupling pins is achieved even when the conveyor pans undergo horizontal and vertical angling.

According to a further feature refining the invention, each coupling plate has on both its parallel upper and lower longitudinal edges integrally formed-on edge strips, which project inwards towards the profiled strips of the side profile and by which the coupling plates are supported directly underneath and above the relevant flange strip of the side profile, against profiled strips thereof, the welding of the coupling plates to the flange strips taking place at these edge strips. The double shackle used as a coupling element has a width which is expediently somewhat less than the width (height) of the coupling plates.

In summary, there is provided an improved conveyor pan connection of a scraper chain conveyor. The conveyor pan has side profiles comprising profiled strips which form guide channels for scrapers and also has outwardly directed flange strips. The conveyor pan connection includes coupling plates which are welded in between the outwardly directed flange strips at the ends of the side profiles of the conveyor pans, a first coupling plate projecting from an end of a first conveyor pan over a joint between conveyor pans and a second coupling plate at the opposing end of a second conveyor pan is set back with respect to the joint. Each coupling plate is comprised of a plate portion, an outwardly projecting coupling pin with a convexly rounded rear face, an outwardly projecting retaining lug on the same face and toward the end of the coupling plate distal to the joint, and one or more integral ribs on the rear side of the plate, such that when the coupling plate is in position on the side profile, the plate portion is concealed between the outwardly directed flange strips. The coupling pin and retaining lug extend outward past the outer surface of the side profile and the integral ribs engage a profiled recess of the side profile. There also provided as a coupling element a flat double shackle which is fitted laterally onto the coupling pins by opening which are divided by a cross piece, and is held in position by securing elements which extend between the double shackle and the retaining lugs. In one preferable arrangement, the integral ribs extend only over the end region of the coupling plates on the joint side. In another preferable arrangement, the coupling plates have a recess on the upper and lower longitudinal edges which lie adjacent to the outwardly directed flange strips at a distance inward from the end closest to the joint, and approximately equal to the amount by which a coupling plate extends over the joint. Preferably, the coupling pins have on their lower end a bead which extends onto the double shackle at the inner contour of the opening. In addition, each coupling plate preferably has on its upper and lower longitudinal edges integral edge strips which project inwards toward the profiled strips of the side profile. The coupling plates are preferably beveled along at least on part of their upper and lower longitudinal edges at an angle to the integral edge strips. Preferably, the double shackle has a width which is less than the distance between the outwardly directed flange strips of the side profiles. Furthermore, the coupling plates are preferably symmetrical about horizontal axis.

These and other objects features and advantages become apparent to those skilled in the art upon reading the following detailed description of the invention set forth below.

BRIEF DESCRIPTION OF THE PREFERRED EMBODIMENT

Figure 5:
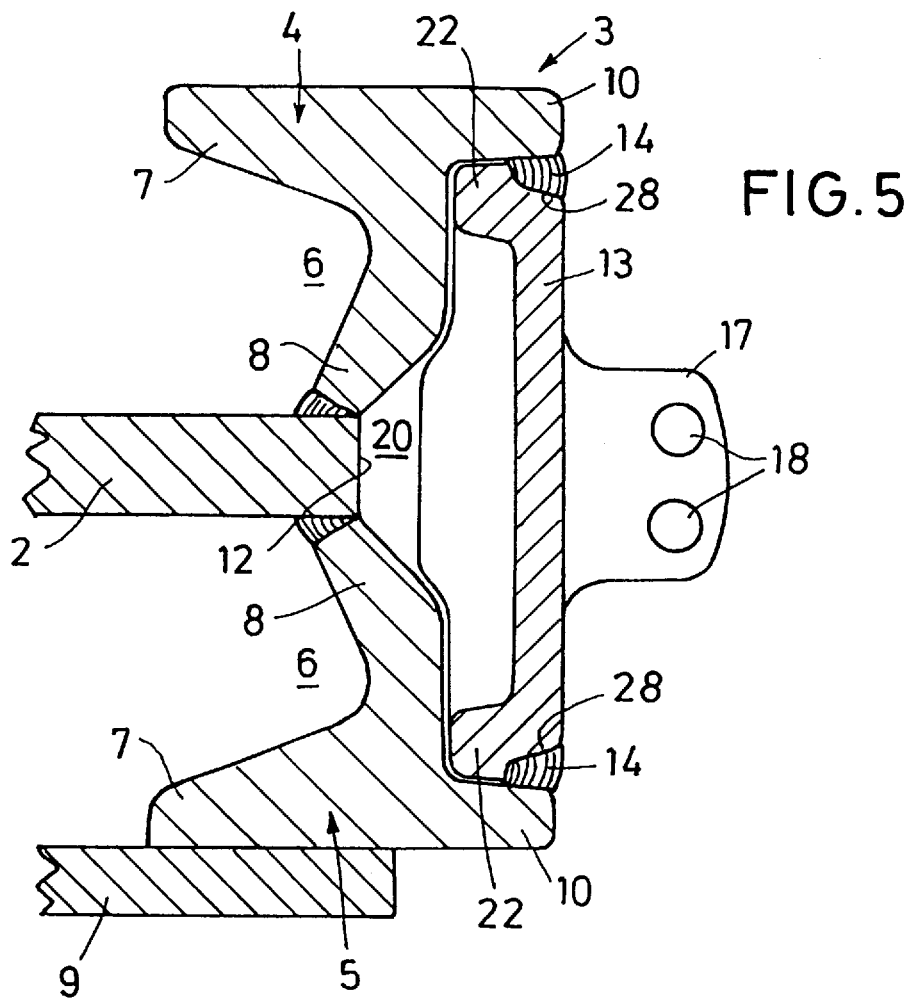
FIG. 5 shows in a sectional representation parallel to FIG. 4 one side profile of a conveyor pan with the welded-in coupling plate.

Referring now to the drawings, wherein the showings are for the purpose of illustrating preferred embodiments of the invention only and not for the purpose of limiting the same, reference is first had to FIG. 5 which illustrates the individual conveyor pans 1, which together form the conveying trough of the scraper chain conveyor, respectively having a conveying base 2 with side profiles 3, which are welded on on both sides of the said base and, as FIG. 5 shows, respectively comprise two cast or rolled profiled strips 4 and 5 of the same design, which form in the upper run and in the lower run of the conveying trough guide channels 6 for guiding the scrapers. Each profiled strip 4 and 5 has a profile flange 7, which respectively forms the top flange or bottom flange of the side profile 3 and is provided with an arcuately curved profile leg 8, which is directed obliquely towards the conveying base 2 by welding. On the underside of the profile flanges 7 of the profiled strips 5 there may be welded on, as known, a cover plate 9 closing the lower run of the conveying trough. In extension of their inwardly directed profile flanges 7, the profiled strips 4 and 5 have outwardly projecting flange strips 10, as is known.

Figure 1:
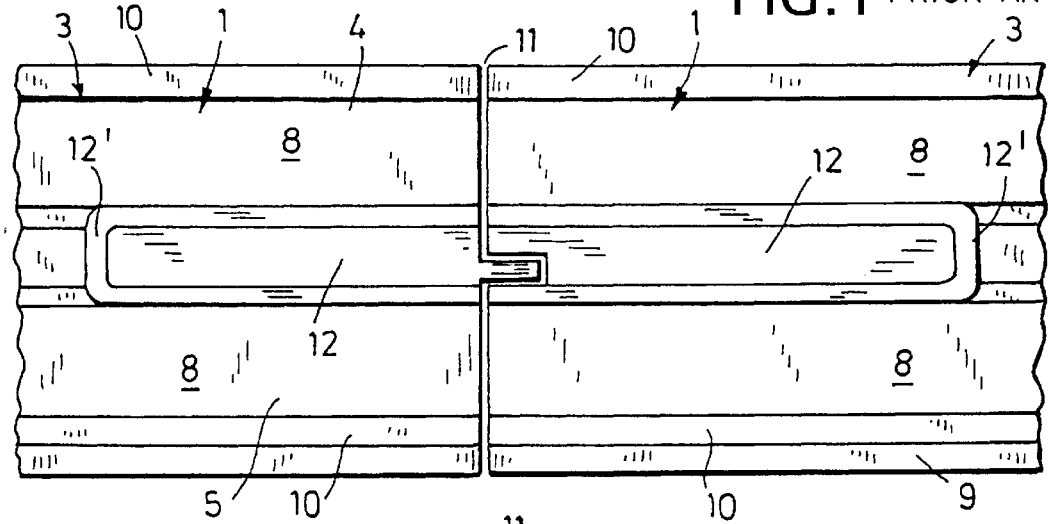
FIG. 1 shows in a side view and in a direction looking at the outer side of the side profiles two conveyor pans in the region of the joint, without welded-on coupling plates.

FIG. 1 shows two successive conveyor pans 1 of the aforementioned known design in the region of their joint 11 in the tough. In addition, FIGS. 1 and 5 reveal that the side profiles 3, comprising the profiled strips 4 and 5, of the conveyor pans have on their outer side, in line with the conveying base, profiled recesses 12, which are bounded by the outer faces of the profile legs 8 and, at their base, are bounded by the side edge of the conveying base 2.

The individual conveyor pans 1 are connected in a known way by means of conveyor pan connections to form the conveying trough. In this case, coupling plates 13 are welded in on the outer sides of the side profiles 3 in the profiled space between the flange strips 10 arranged one above the other, the two coupling plates 13 which respectively form an individual conveyor pan connection being connected at their upper and lower longitudinal edge by means of welds 14 to the inner sides of the flange strips 10. The coupling plates 13 comprise forged parts and have in each case an integrally formed-on, outwardly projecting coupling pin 15 with convexly curved rear face 16 and also, at a distance from the coupling pin 15, in each case a formed-on retaining lug 17, which lugs are provided with two parallel oblique bores 18, into which a securing element in the form of a U-shaped two-pronged fork 19 can be inserted (FIG. 3).

Figure 4:
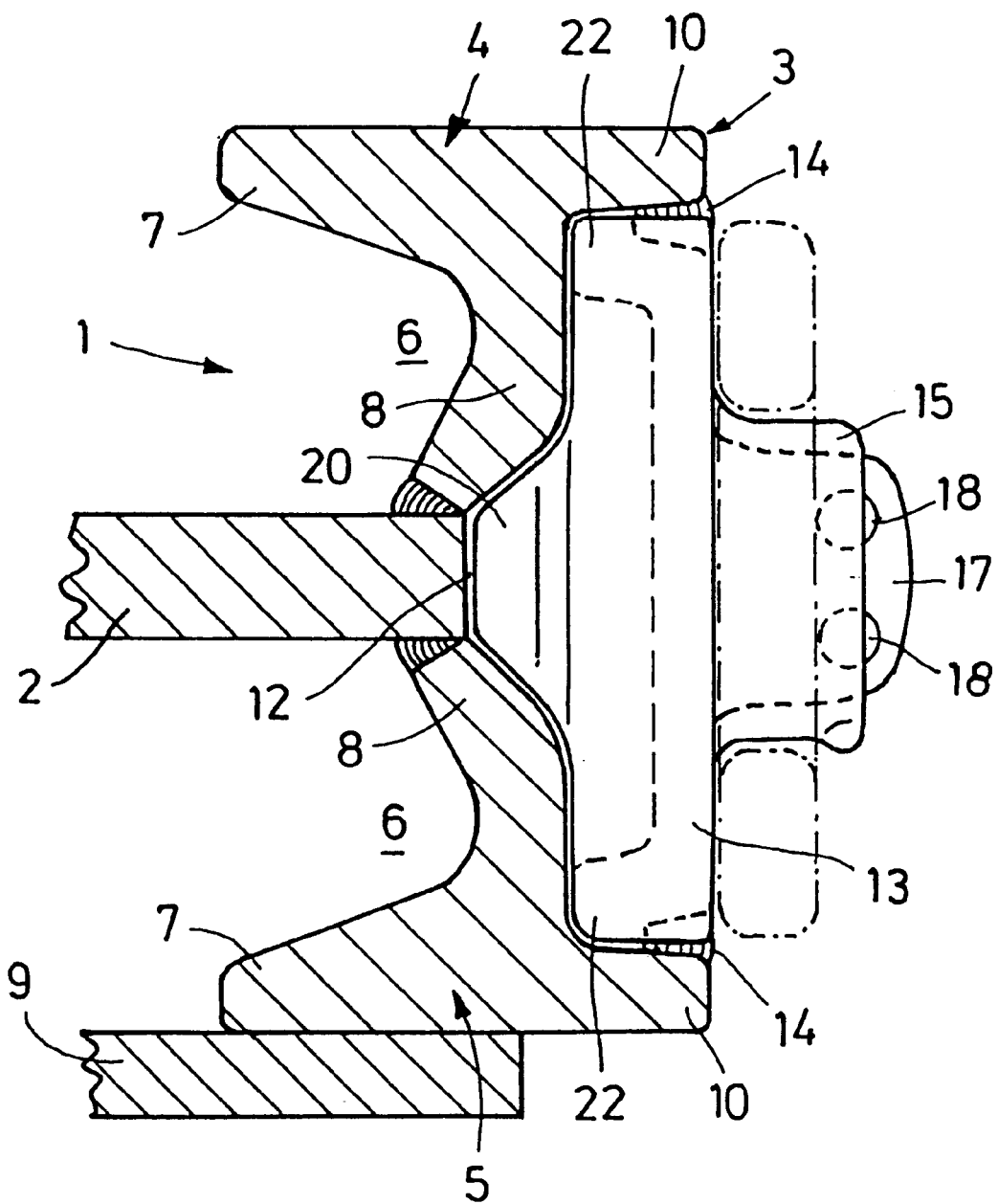
FIG. 4 shows a vertical section through one of the two side profiles of a conveyor pan, the welded-in coupling plate being shown in an end-on view.
Figure 6:
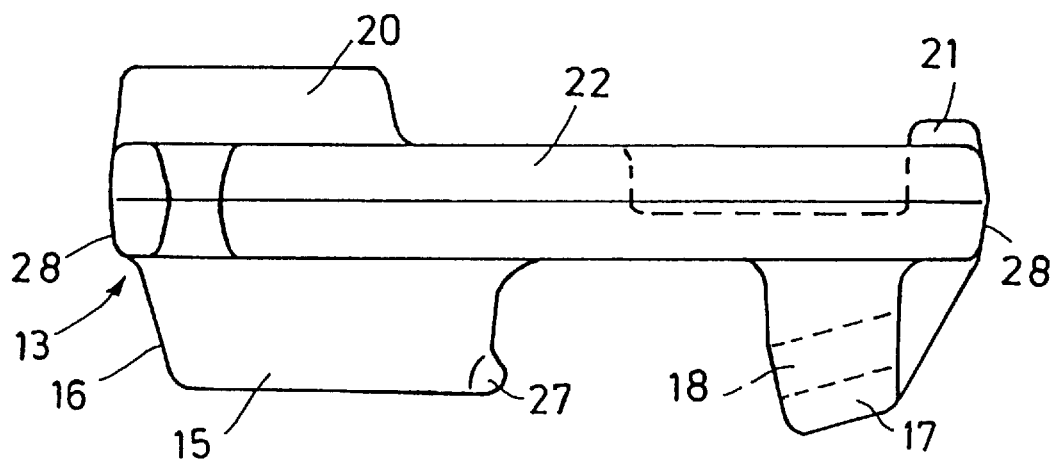
FIG. 6 shows an individual coupling plate in plan view.

As FIGS. 4 to 6 show in particular, each coupling plate 13 has on its rear side, facing the side profile 3, in line with the profiled recess 12, in other words in the centre of the plate, a formed-on rib 20, the outer contour of which is adapted to the inner contour of the profiled recess 12 and which engages into the profiled recess 12. On each coupling plate 13, the rib 20 extends only over the end region of the same where on the opposite side the coupling pin 15 is located. At the rear end of the coupling plate 13, where the retaining lug 17 is located, the coupling plate has on its rear side a lug 21 likewise engaging in the profiled recess 12. In addition, each coupling plate 13 is provided on its upper and lower longitudinal edge with an integrally formed-on edge strip 22, which projects inwards towards the relevant profiled strip 4 or 5 of the side profile 3 and, as FIG. 5 shows in particular, lies in the angle between the flange projection 10 and the projection of the profile leg 8 and is supported here against the relevant profiled strip, the coupling plate 13 being welded in the region of these edge strips by means of the welds 14 to the flange strips 10. The two coupling plates 13, of the same design, are designed approximately rectangular in outline and are, moreover, designed symmetrically with respect to their horizontal longitudinal centre axis, so that they can be welded onto the side profiles of the conveyor pans in each of their two turned positions.

Figure 2:
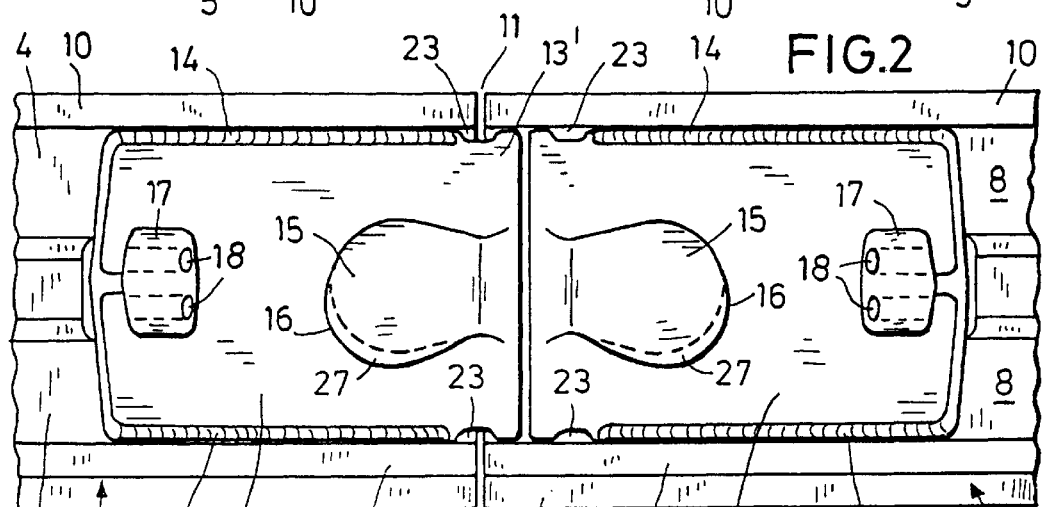
FIG. 2 shows in the view according to FIG. 1 the coupling plates welded onto the ends of the conveyor pans, without the coupling element fitted onto their coupling pins.
Figure 3:
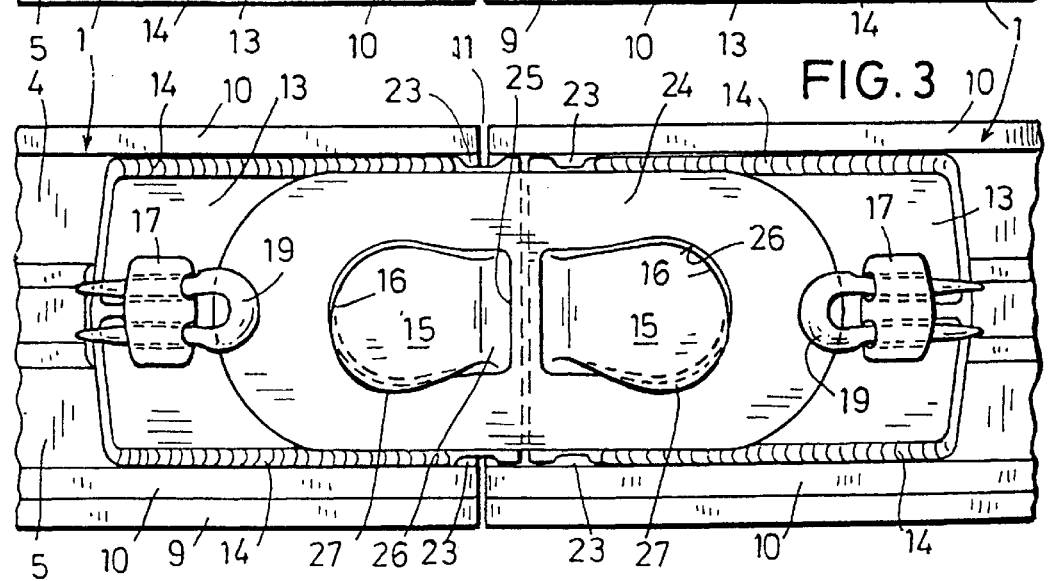
FIG. 3 shows in the view according to FIG. 2 the coupling element fitted onto the coupling pins and comprising a double shackle, together with the assigned securing elements of the same, comprising two-pronged forks.

As FIGS. 2 and 3 show, at each conveyor pan connection one coupling plate 13, here the coupling plate 13 arranged on the left-hand conveyor pan, is welded onto this conveyor pan or its side profile in such a way that it projects with its plate end 13' over the joint 11 in the trough into the profiled space between the flange strips 10 of the other (right-hand) conveyor pan, while the assigned coupling plate 13 of the other (right-hand) conveyor pan is welded onto the side profile 3 of this conveyor pan such that it is set back by a corresponding amount with respect to the joint 11 in the trough. Consequently, the gap at the joint 11 in the trough, in other words the gap between the end faces of the side profiles of the conveyor pans, is closed at the sides and, in addition, a side centring of the conveyor pans 1 coupled by means of the conveyor pan connection is achieved.

Furthermore, FIGS. 2 and 3 reveal that the two coupling plates 13 respectively have on their two parallel upper and lower longitudinal edges a recess 23, to be precise at a distance from the free vertical end face of the coupling plate which corresponds approximately to the amount by which one coupling plate 13 projects over the joint 11 in the trough. FIGS. 2 and 3 reveal that, when there are vertical angling movements of the coupled conveyor pans 1 in relation to one another, the end faces of the side profiles 3 forming the joint 11 in the trough can swing into the plate recess 23. Therefore, with the described design of the coupling plates and their welded fastening on the side profiles, the recesses 23 permit vertical angular movements between the conveyor pans 1 coupled by means of the conveyor pan connections.

As FIGS. 3 and 4 show, used as the coupling element on each conveyor pan connection is a chain link-like flat double shackle 24, the inner opening of which is divided centrally by a cross-piece 25 and which is fitted onto the coupling pins 15 of the two coupling plates 13 from the outside, whereby the tensionally resistant connection of the conveyor pans is established, while preserving their angular mobility in the horizontal and vertical directions. The securement of the double shackle 24 on the two coupling pins 15 of the two coupling plates 13 from the outside, whereby the tensionally resistant connection of the conveyor pans is established, while preserving their angular mobility in the horizontal and vertical directions. The securement of the double shackle 24 on the two coupling pins 15 takes place by the abovementioned two-pronged forks 19, which are inserted by their prongs into the openings or bores 18 of the retaining lugs 17 in such a way that they reach with their U-shaped back over the double shackle 24. The rear faces 16 of the coupling pins 15 are adapted to the arcuate inner contour of the inner openings 26 of the double shackle, whereby good surface contact is achieved between these parts. In addition, FIGS. 2, 3 and 4 reveal that the coupling pins 15 formed onto the coupling plates 13 respectively have on their lower peripheral region, i.e. on their lower half of the limitation of the pin, a formed-on peripheral bead 27, which reaches over the lower horizontal leg of the double shacked 24, on the outside, when the said shackle is fitted on (FIG. 3), whereby a reliable seating of the double shackle on the coupling pins is achieved. Finally, FIGS. 3 and 4 show that the width, in other words the height, of the double shackle 24 is somewhat less than the width or the height of the coupling plates 13.

FIGS. 4 and 5 reveal that the coupling plates 13 are arranged with their plate parts concealed in the profiled space between the flange strips 10 of the side profiles 3 and do not project outwards beyond the outer end faces of the flange strips 10. In contrast, the coupling pins 15 and also the retaining lugs 17 protrude outwards from the profiled spaces between the flange strips 10.

As FIGS. 1 and 2 reveal, the abovementioned profiled recesses 12, into which the coupling plates 13 engage with a form fit by their rear ribs 20, may be bounded at their ends 12' remote from the joint 11 in the trough, so that behind these ends less deep profiled recesses are provided on the side profiles 3.

Otherwise, the coupling plates 13 of the conveyor pan connection described form simple weld-on parts which can, if need be, be welded onto the known conveyor pans instead of the coupling plates for the conventional toggle connections, without modifications to the conveyor pans being required for this purpose. According to FIG. 5, the coupling plates 13 have on their upper and lower longitudinal edge, at the transition to the edge strips 22, recesses 28, at which they are welded onto the flange strips 10 at 14.

The invention has been described with reference to preferred and alternate embodiments. Modifications and alterations will become apparent to those skilled in the art upon the reading and understanding of the detailed description of the invention provided herein. This invention is intended to include all such modifications and alterations in so far as they come within the scope of the present invention.

We claim:

1. A conveyor pan connection of a scraper chain conveyor, the conveyor pans having side profiles comprising profiled strips which form guide channels for scrapers and having outwardly directed flange strips, the connection comprising coupling plates which are welded in between the outwardly directed flange strips at the ends of the side profiles of the conveyor pans, a first coupling plate projecting from an end of a first conveyor pan over a joint between conveyor pans and a second coupling plate at the opposing end of a second conveyor pan is set back with respect to the joint, wherein each coupling plate is comprised of a plate portion, an outwardly projecting coupling pin with a convexly rounded rear face, an outwardly projecting retaining lug on the same face and toward the end of the coupling plate distal to the joint, and one or more integral ribs on the rear side of the plate, such that when the coupling plate is in position on the side profile, the plate portion is concealed between the outwardly directed flange strips, the coupling pin and retaining lug extend outward past the outer surface of the side profile and the integral ribs engage a profiled recess of the side profile, there also being provided as a coupling element a flat double shackle which is fitted laterally onto the coupling pins by an opening which is divided by a cross piece, and is held in position by securing elements which extend between the double shackle and the retaining lugs, wherein said coupling plates have a recess on the upper and lower longitudinal edges which lie adjacent to the outwardly directed flange strips at a distance inward from the end closest to the joint, and approximately equal to the amount by which a coupling plate extends over the joint.

2. A conveyor pan connection according to claim 1, wherein the double shackle has a width which is less that the distance between the outwardly directed flange strips of the side profiles.

3. A conveyor pan according to claim 1, wherein the coupling plates are symmetrical about horizontal axis.

4. A conveyor pan connection according to claim 1, wherein said integral ribs extend only over the end region of said coupling plates on the joint side.

5. A conveyor pan connection according to claim 1, wherein said coupling pins have a bead which extends onto the double shackle.

6. A conveyor pan connection according to claim 1, wherein each coupling plate has on its upper and lower longitudinal edges integral edge strips which project inwards toward the profiled strips of the side profile.

7. A conveyor pan connection according to claim 6, wherein the coupling plates are beveled along at least part of their upper and lower longitudinal edges at an angle to the integral edge strips.

8. A conveyor pan connection according to claim 7, wherein said integral ribs extend only over the end region of said coupling plates on the joint side.

9. A conveyor pan a connection according to claim 7, wherein said coupling pins have a bead which extends onto the double shackle.

10. A conveyor pan connection according to claim 8, wherein said coupling pins have a bead which extends onto the double shackle.

11. A conveyor pan connection according to claim 2, wherein said integral ribs extend only over the end region of said coupling plates on the joint side.

12. A conveyor pan connection according to claim 2, wherein said coupling pins have a bead which extends onto the double shackle.

13. A conveyor pan connection according to claim 2, wherein each coupling plate has on its upper and lower longitudinal edges integral edge strips which project inwards toward the profiled strips of the side profile.

14. A conveyor pan connection according to claim 13, wherein said coupling plates are beveled along at least part of their upper and lower longitudinal edges at an angle to the integral edge strips.

15. A conveyor pan connection according to claim 14, wherein said integral ribs extend only over the end region of said coupling plates on the joint side.

16. A conveyor pan connection according to claim 14, wherein said coupling pins have a bead which extends onto the double shackle.

17. A conveyor pan connection according to claim 15, wherein said coupling pins have a bead which extends onto the double shackle.

* * * * *